(12) United States Patent
Buck et al.

(10) Patent No.: US 9,580,028 B2
(45) Date of Patent: Feb. 28, 2017

(54) ADJUSTING OR SETTING VEHICLE ELEMENTS THROUGH SPEECH CONTROL

(75) Inventors: Markus Buck, Biberach (DE); Tim Haulick, Blaubeuren (DE); Gerhard Uwe Schmidt, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1297 days.

(21) Appl. No.: 12/241,837

(22) Filed: Sep. 30, 2008

(65) Prior Publication Data

US 2009/0089065 A1    Apr. 2, 2009

(30) Foreign Application Priority Data

Oct. 1, 2007    (EP) ..................... 07019283

(51) Int. Cl.
*G10L 15/22*       (2006.01)
*B60R 16/037*    (2006.01)
(Continued)

(52) U.S. Cl.
CPC .......... *B60R 16/0373* (2013.01); *G10L 15/22* (2013.01); *G10L 15/265* (2013.01); *G10L 17/005* (2013.01)

(58) Field of Classification Search
CPC .. G10L 15/22; G10L 2015/223; G10L 15/265
(Continued)

(56) References Cited

U.S. PATENT DOCUMENTS 4,593,403 A    6/1986 Kishi et al.
6,006,175 A *  12/1999 Holzrichter .......... A61B 5/0507
                                                          704/205

(Continued)

FOREIGN PATENT DOCUMENTS

EP    0 094 449 A1    11/1983
EP    0 488 733 A2     6/1992
(Continued)

OTHER PUBLICATIONS

Schmidt et al. "Signal Processing for In-Car Communication Systems" 2006.*
(Continued)

*Primary Examiner* — Huyen Vo
*Assistant Examiner* — Rodrigo Chavez
(74) *Attorney, Agent, or Firm* — Alleman Hall McCoy Russell & Tuttle LLP (57) ABSTRACT

A speech processing device includes an automotive device that filters data that is sent and received across an in-vehicle bus. The device selectively acquires vehicle data related to a user settings or adjustments. An interface acquires the selected vehicle data from in-vehicle sensors in response to a user's articulation of a first code phrase. A memory stores the selected vehicle data with unique identifying data associated with the user and establishes a connection between the selected vehicle data and the user when a second code phrase is articulated. A data interface provides access to the selected vehicle data and stored relationship data and enables the processing of the data to customize the in-vehicle system. The data interface is responsive to the user's articulation of a third code phrase to process the selected vehicle data that enables the setting or adjustment of the in-vehicle system.

20 Claims, 8 Drawing Sheets

(51) Int. Cl.
  *G10L 15/26* (2006.01)
  *G10L 17/00* (2013.01)
(58) Field of Classification Search
  USPC .......................................................... 704/275
  See application file for complete search history.

(56) References Cited

U.S. PATENT DOCUMENTS

| | | | |
|---|---|---|---|
| 6,584,439 B1* | 6/2003 | Geilhufe et al. | 704/270 |
| 7,158,871 B1* | 1/2007 | Ilan et al. | 701/49 |
| 7,747,445 B2* | 6/2010 | Agapi et al. | 704/275 |
| 7,774,202 B2* | 8/2010 | Spengler et al. | 704/236 |
| 7,826,945 B2* | 11/2010 | Zhang | G06F 3/16 701/36 |
| 7,920,682 B2* | 4/2011 | Byrne | H04M 1/645 345/473 |
| 2003/0120422 A1* | 6/2003 | Cochlovius et al. | 701/201 |
| 2003/0130776 A1* | 7/2003 | Busse | 701/36 |
| 2004/0030560 A1* | 2/2004 | Takami et al. | 704/275 |
| 2006/0100870 A1* | 5/2006 | Shikano et al. | 704/254 |
| 2006/0190097 A1* | 8/2006 | Rubenstein | 700/17 |
| 2007/0005206 A1* | 1/2007 | Zhang | G06F 3/16 701/36 |
| 2007/0082689 A1* | 4/2007 | Talty | H04L 12/189 455/518 |
| 2007/0124149 A1* | 5/2007 | Shen | G10L 15/26 704/275 |
| 2007/0203699 A1* | 8/2007 | Nagashima | 704/241 |
| 2007/0288242 A1* | 12/2007 | Spengler et al. | 704/275 |
| 2008/0015863 A1* | 1/2008 | Agapi | G10L 15/22 704/275 |
| 2008/0133230 A1* | 6/2008 | Herforth | G01C 21/26 704/235 |
| 2008/0256613 A1* | 10/2008 | Grover | 726/5 |
| 2009/0006088 A1* | 1/2009 | Gajic et al. | 704/233 |
| 2009/0055178 A1* | 2/2009 | Coon | 704/246 |

FOREIGN PATENT DOCUMENTS

| | | |
|---|---|---|
| EP | 0 488 733 A3 | 10/2004 |
| WO | WO 2004/086360 | 10/2004 |

OTHER PUBLICATIONS

Wolf et al. "Security in Automotive Bus Systems" 2004.*
Wolf et al. (NPL Document "Security in Automotive Bus Systems").*

* cited by examiner

ADJUSTING OR SETTING VEHICLE ELEMENTS THROUGH SPEECH CONTROL

PRIORITY CLAIM

This application claims the benefit of priority from European Patent 07019283.6 dated Oct. 1, 2007, which is incorporated by reference.

BACKGROUND OF THE INVENTION

1. Technical Field

This disclosure relates to vehicle elements and, in particular, to an adjustment of vehicle elements through a speech control.

2. Related Art

Drivers and passengers operate devices when traveling. Drivers may control mirrors, displays, navigation systems, and entertainment systems. In many systems in vehicle devices are manually controlled. With so many devices to control, setting the devices is challenge and a distraction too.

There is a need for a hands free adjustment of vehicle elements. The control may provide access to one or more in-vehicle systems.

SUMMARY

A speech processing device includes an automotive device that filters data that is sent and received across an in-vehicle bus. The device selectively acquires vehicle data related to a user settings or adjustments of an in-vehicle system. An interface acquires the selected vehicle data from one or more in-vehicle sensors in response to a user's articulation of a first code phrase. A memory stores the selected vehicle data with unique identifying data associated with a user within the vehicle. The unique identifying data establishes a connection between the selected vehicle data and the user when a second code phrase is articulated by the user. A data interface provides access to the selected vehicle data and relationship data retained in the memory and enables the processing of the data to customize an in-vehicle system. The data interface is responsive to a user's articulation of a third code phrase to process the selected vehicle data that enables the setting or adjustment of the in-vehicle system.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A process automatically adjusts one or more devices that interface a device or structure that transports person or things. The process may recognize and analyze spoken words to receive commands or data input from a speaker. Some processes may recognize a variety of speech patterns, accents, and multiple ways in which a statement or request may be made. Some processes may "learn" by processing weighted inputs or code phrases to produce or program desired outputs. Some natural language processes recognize and react to weighted inputs or code phrases through a sequence that achieves a result or produces an output that may then be linked and actuated to other weighted inputs or code phrases.

Figure 1:
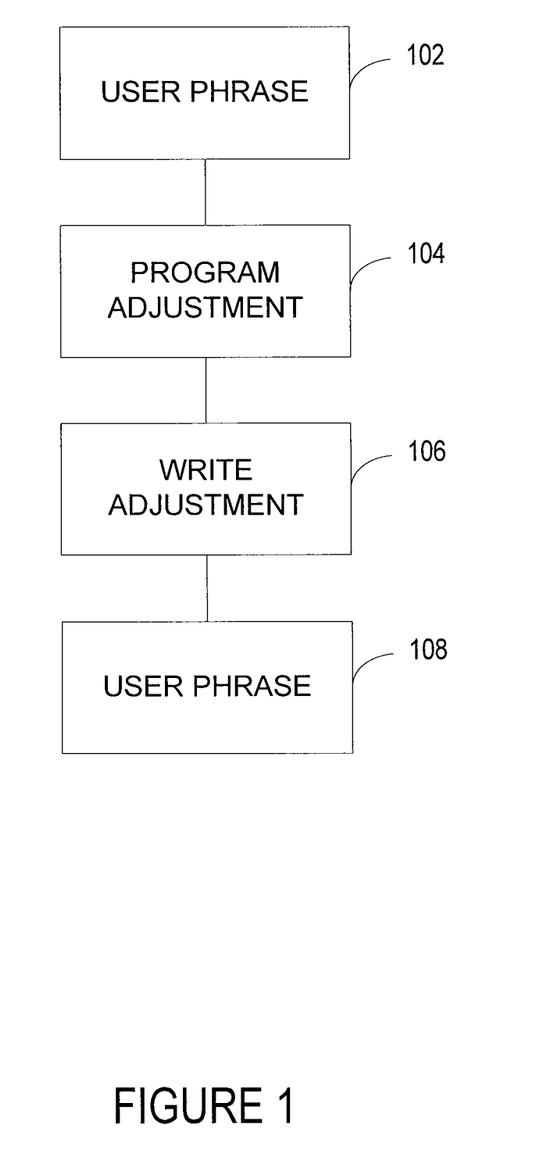
FIG. 1 is a process that may set or adjust one or more vehicle devices.

A method may automatically program an adjustment to a vehicle device when a first code phrase is processed as shown at 102 in FIG. 1. The recognition may operate one, two, three or more vehicle devices or elements that may be adjusted by a driver or a passenger. When a second code phrase is recognized by the speech recognition device or software, data or software (e.g., a device driver) that effects a mechanical or electronic operation may be stored in a memory at 104. The operation may include operating or adjusting one or more in-vehicle or remote devices or elements. The process may write to a storage medium when a vehicle element is operated or adjusted or query a vehicle controller at 106. Once stored, a third input or code phrase may be received and linked to the software or data to identify the stored data or software that effects the mechanical operation, electronic operation, and/or adjustment at 108. Each of the code phrases may be retained in a local or remote distributed or central memory linked to or native to the vehicle or vehicle control module (e.g., electronic control module, electronic control unit, body control module, entertainment control module, control module, and/or etc.).

Figure 2:
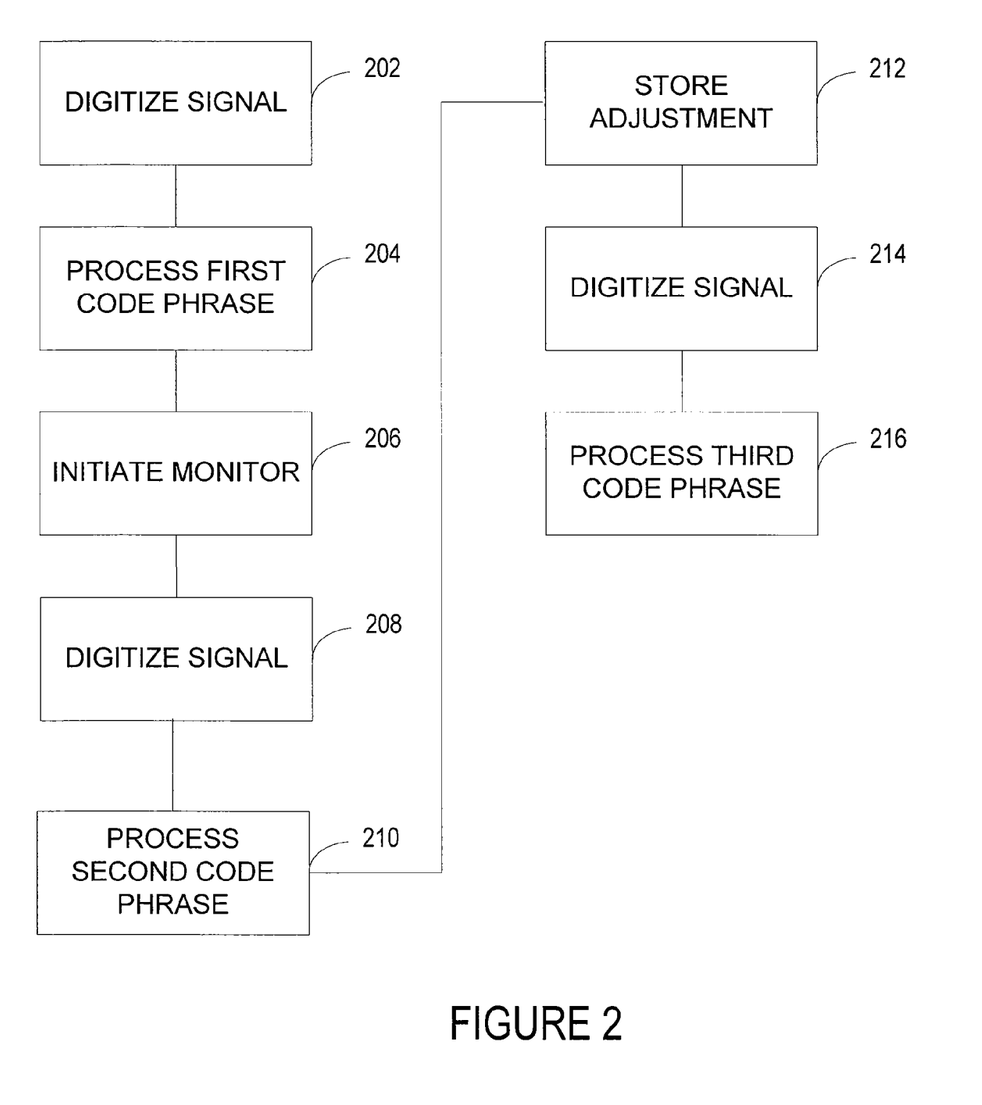
FIG. 2 is a second alternate process that may set or adjust one or more vehicle devices.

The alternative method of FIG. 2 may adjust an in-vehicle device when processing a code phrase transmitted from a local or remote speech recognition device or speech recognition software retained in a storage medium. When a first code word is recognized (after it is digitized and processed by the speech recognition device or software), a vehicle device, system, or feature may monitored as it is actuated or adjusted at 202-206. When a second code phrase is recognized, data or software that causes or may initiate the mechanical or electronic operation or the adjustment may be stored in a local or remote memory at 208-212. When processed at 214-216, a third code phrase recognized by the speech recognition device or software may identify and initiate the processing of the stored data or software that enable the mechanical operation, electronic operation, and/ or combined adjustment. Once stored, the recognition or articulation of the third code phrase may automatically effect a desired operation. The operation may adjust or activate any vehicle related system such as a seating system, one or more mirror controls, an electronic entertainment or navigation device (e.g., an audio system, a media or multi-media system, a navigation system, a wireless communication device such as a phone, etc.), or any in-vehicle or vehicle related system, for example. In other processes, the operation may tune a filter such as a bandwidth filter (e.g., select an audio channel), adjust a volume level, a treble setting, a bass setting, a balance control, and/or other aural setting.

In some processes, the operation may affect in-vehicle comfort or monitor environmental conditions. The operation may adjust or actuate electronic climate controls that may interface a heating or an air conditioner or may adjust or actuate in-vehicle or out-of-vehicle monitoring systems (e.g., driving conditions, driving behavior monitors, etc.).

Figure 3:
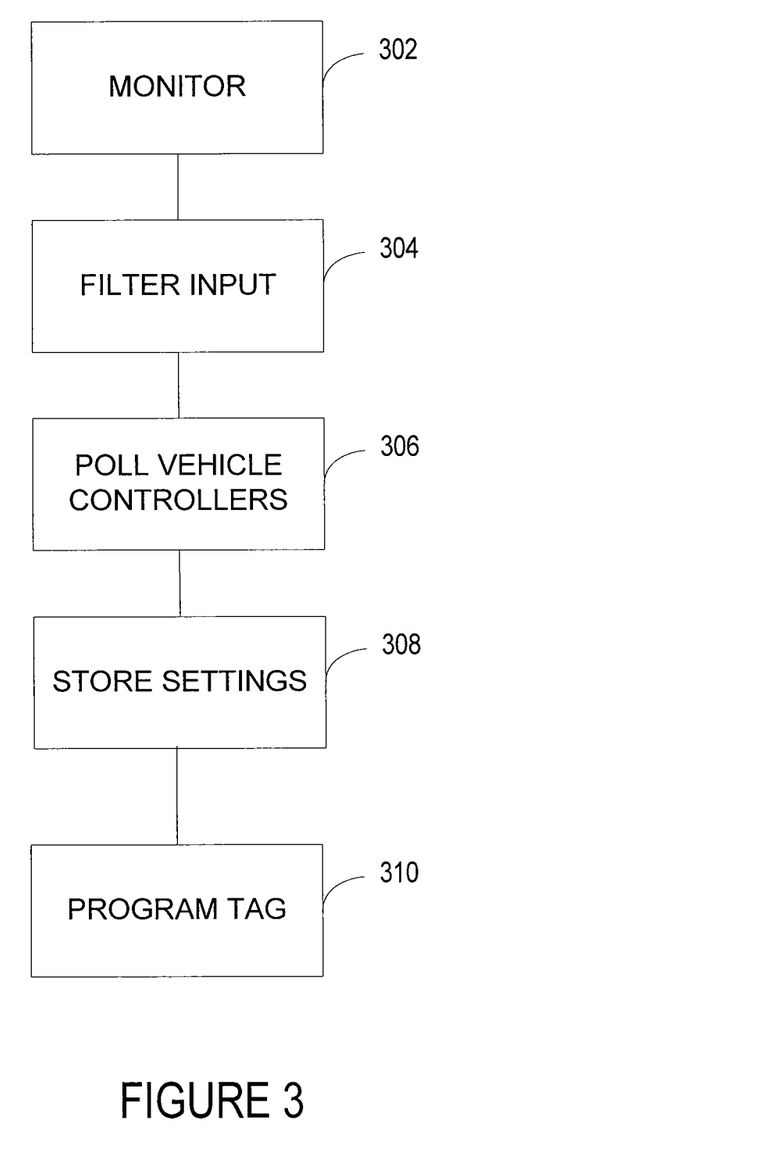
FIG. 3 is a third alternate process that may set or adjust one or more vehicle devices.

Automatic adjustment of one, two, or more vehicle elements may be facilitated by other processes such as the process shown in FIG. 3. The speech recognition (and control) system or process may be programmed to allow driver or passenger to program multiple adjustments (or device settings) that may be locally stored (or remotely stored to allow access from remote locations that may be applied to different vehicles) and subsequently retrieved by a voice command. In some processes, the first code phrase may initiate a monitoring and buffering of operations that follow one or more desired adjustments at 302. The in-vehicle monitoring process (or processor or speech recognition controller) may filter that data that is sent and received across one or more vehicle buses described in this disclosure at 304. In some processes and systems, the monitoring process (or processor or speech recognition controller) may selectively poll one or more OEM (Original Equipment Manufacturer) and/or aftermarket in vehicle controller to transmit data related to the user's adjustments (or device settings) or desired operating characteristics that may be acquired at predetermined intervals or upon an event at 306. If a user (e.g., a driver or passenger of a vehicle) were to adjust a seat and desired the position to be retained (e.g., the height, the distance, inclination of the seat or seat back) the user may articulate a first code phrase like "Start recording" or "Initiate adjustment", etc.

When recognized, the user's actions or device adjustments may be monitored and recorded at 308. The user may adjust the seat through integrated or distributed switches and/or controls that mediate its position. The recognition of a second code phrase may retain the parameters (e.g., "Adjustment completed"). A user may then link one or more identifiers or characters to identify or link the parameters to a third phrase or speech pattern at 310. A user may be prompted, (e.g., by a synthesized speech output that may be delivered through the in-vehicle audio system, a visual output, or a tactile output), to articulate the third code phrase (e.g., "Seat adjustment") that may be processed to tag the file.

The adjustment parameters, operations, and tags may be stored in a data file. When processed, the data file may cause control devices to transmit signals that manage or drive servo-motors, tuners (e.g., frequency), navigation settings, and/or other vehicle or vehicle related devices. Dynamic and/or static memory that store the data file may be controlled by a local or a remote speech recognition device or speech recognition software (retained in a memory or other storage media) that interfaces the devices through a powertrain, entertainment, and/or comfort bus. When a user articulates a third code phrase, the phrase may be translated into executable commands that access and actuate one or more operations.

In some applications, a user's verbal commands may adjust performance (e.g., engine settings or other inputs), select and/or queue entertainment, and/or adjust climate and/or comfort devices. A user may adjust one or more seats, mirrors, audio systems, climate systems, pedal positions (e.g., accelerator, brake, clutch, parking brake, etc.), and engine setup by a common or single command. Adjustments may be monitored and conveyed by one or more physical or wireless vehicle buses to an OEM's or after market system. The adjustments may be recorded and stored in a tagged data file in response to a second and a third code phrase or speech pattern. The process may enable an automatic adjustment of one, two, three, or more vehicle elements through a common phrase (e.g., the third code phrase).

In some applications the process may control vehicle navigation systems. An adjustment may comprise entering one or more destinations, calculating routes (e.g., from a current location or programmed location), selecting maps, adjusting visual displays, setting or adjusting aural alerts, selecting travel preferences, or setting or adjusting a user controlled input or output. In these applications a user may retrieve stored destinations and/or routes.

A system may automatically adjust one more devices that interface a vehicle. The system may receive commands or data input from a speaker. Some systems may "learn" by processing inputs or code phrases. The systems may recognize and react to inputs or code phrases through sequences that may linked and actuated by other inputs or code phrases.

Figure 4:
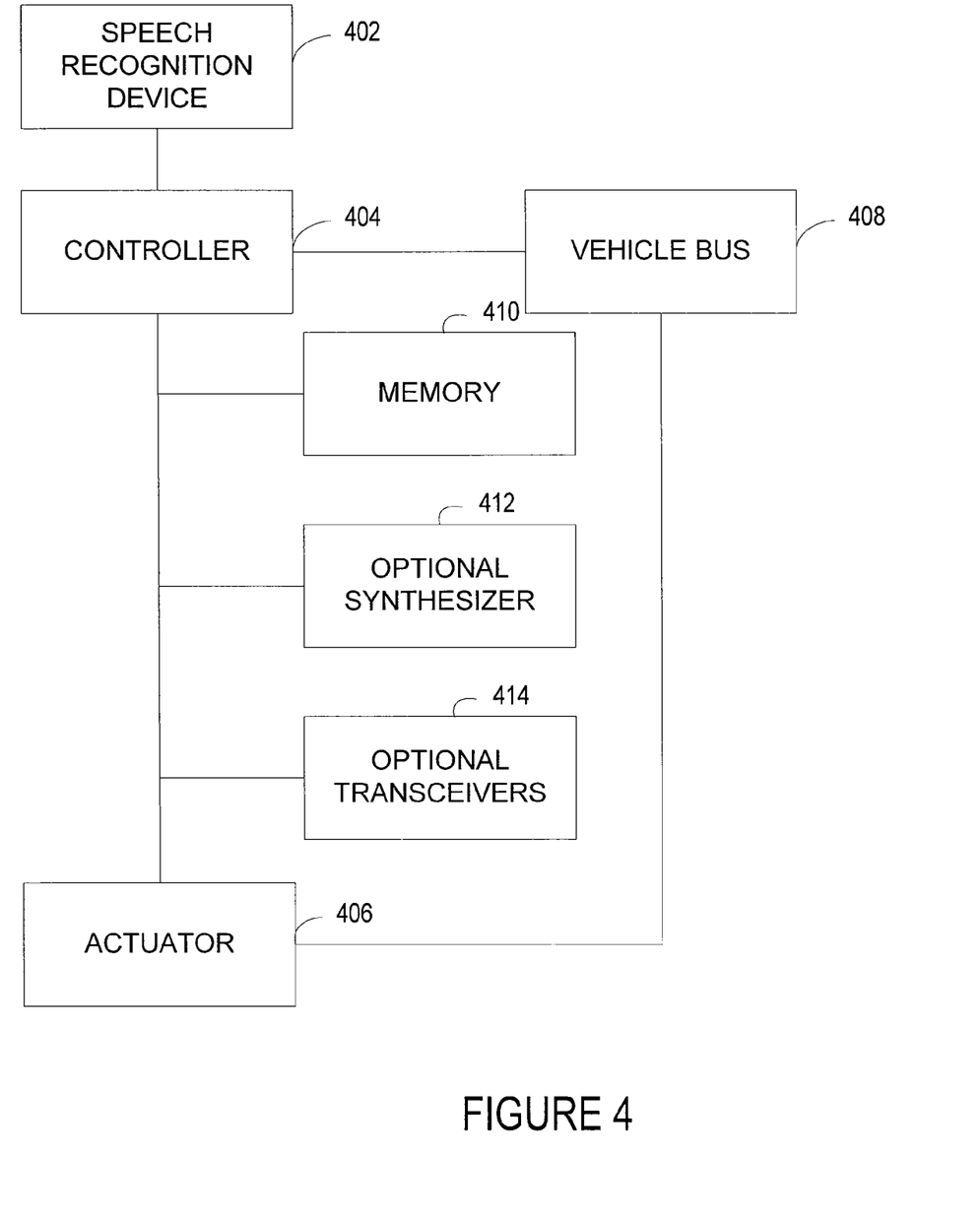
FIG. 4 is a system that may adjust one or more vehicle devices.

A system may include a device that converts spoken words into recognizable commands. The speech recognition device 402 may interface a controller 404 such as a real-time controller that may react to events before the events become obsolete (e.g., an avoidance controller may process multiple inputs, detect risk, and provide alerts while there is still time for a user to react). In response to control signals, an actuator 406 may perform an action such as transmitting an output signal. One or more tangible or wireless vehicle buses 408 (that may interface a wireless service provider) may convey the control signals and/or actuator signals to one or more local or remote (e.g., out-of-vehicle) destinations. The speech recognition device may interpret the continuous or interrupted flow of sound that may comprise speech in real time. When a first code phrase is processed, some speech recognition controllers 404 generate and store a data file in a local or remote memory 410. When a second code phrase is recognized, the system may monitor the tangible or virtual vehicle bus 408 and store the adjustment of one or more vehicle elements read from the vehicle bus in the data file that may be retained in a local (e.g., in-vehicle) or remote (e.g., out-of-vehicle) memory 410. When a third code phrase is recognized for the first time, the data file may be tagged. In some systems, the content of the data file may be contained or nested between the tags and any attributes the tags may have. In other systems, the tag may comprise an identifier, characters, or one or more pointers that identify the address of the data file or means to implement the desired operation. An audio, visual (e.g., a graphical user display), or tactile event (e.g., prompt) may prompt a user to establish a third code phrase that may be processed to tag the file. When the third code phrase is articulated, the phrase may be translated into executable commands by the system that may access and actuate one or more operations that may occur when the data file is processed. The operation may adjust or activate any vehicle related system such as the position of one or more seats, one or more mirrors, or communicate or program one or more powertrain, chassis, climate, entertainment, or navigation devices (e.g., a radio, a media or multi-media system, a navigation system, etc.). In other processes, the operation may tune a pass band of a bandwidth filter (e.g., select an audio channel), adjust a volume level, a treble setting, a bass setting, a balance control, and/or other aural settings.

The controller and memory 404 and 410 may be a unitary part of or integrated within some speech recognition devices or in communication with a speech recognition driver. Some systems may include or interface an optional speech synthesizer (shown as optional 412), a tactile controller, and/or one or more user graphical user interface displays that may prompt a user to articulate a first, a second, and/or a third code phrase. Serial and/or parallel input/outputs may interface the mechanical, electronic, or optical interfaces that facilitate access and/or actuate the desired operations.

Figure 5:
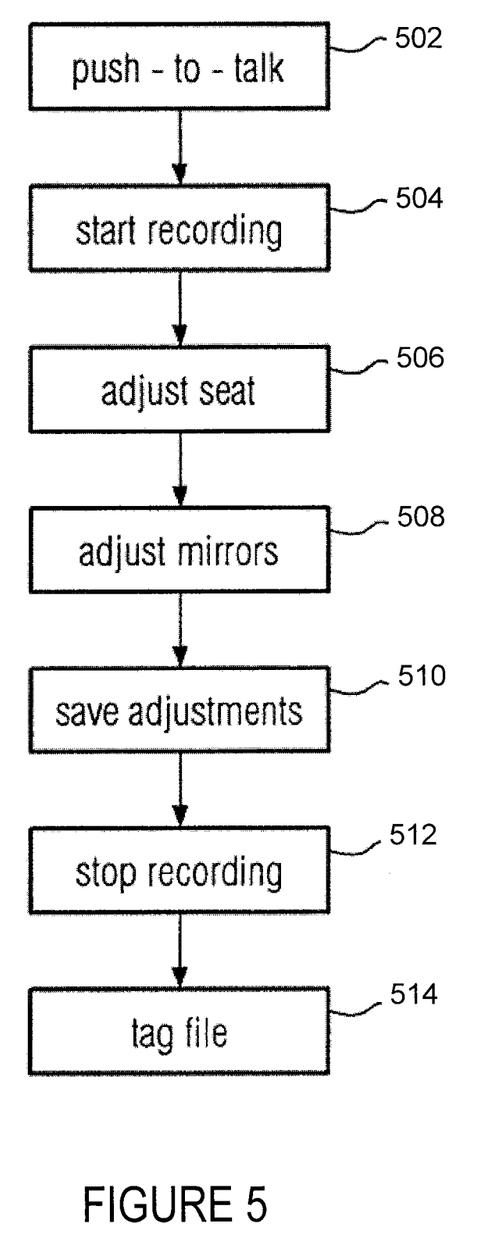
FIG. 5 is an alternate process that adjusts multiple vehicle devices.

An exemplary process that may automatically adjust one or more devices is shown in FIG. 5. A passenger or driver (e.g., occupant) of a vehicle may activate a speech recognition and control process by enabling a push-to-talk or press-to-transmit (both referenced as a PPT) feature 502 or transceiver. In some methods the push-to-talk method enables full-duplex processes (e.g., it may carry communication in both directions at once), in alternative methods, the push-to-talk method enables half-duplex processes (e.g., it may carry information in one direction at a time) that enable communication through an aural or physical activation. In a half-duplex mode, a transmission may be transmitted to a destination before the process establishes a connection (e.g., an existing connection) that may be required in some mobile phones.

In FIG. 5, the speech recognition and control process may be programmed within the vehicle or its OEM or aftermarket controllers and may interface devices that convert sound into analog signals or digital data. Some systems interface one or more microphones or a microphone array that includes two or more directional microphones (e.g., multiple directional microphones). FIG. 5 illustrates a process in which a user may adjust one or more mirrors (e.g., an external/internal driver mirror and/or an external passenger side mirror) and a seating system.

When activated, the speech recognition and control process may receive a code phrase (key phrase) that may initiate a recording (e.g., "Start recording"). A speech recognition processor or software may recognize the command which may initiate a recording, (e.g., by opening or generating one or more data files that are retained in a local or remote memory). The speech recognition and control process may interface a physical or a wireless bus system that interfaces in-vehicle and/or out-vehicle devices and networks. The devices may provide electronic and/or mechanical adjustments (e.g., through actuators, servo-motors, sensor thresholds, visual/aural setting, etc.) that may be used to adjust mechanical and/or electronic elements and devices.

At 506 a user may adjust a seat or seat back (e.g., such as the driver seat by a mechanical adjustment, through one or more key fobs that may have a challenge-response authentication, or by other means). In the example shown in FIG. 5, the user may adjust a driver side mirror and passenger side mirror positioned outside a vehicle cabin and/or an inside mirror at 508. The mirrors may be adjusted by hand, button activations, through a key fob, etc. The speech recognition and control process may monitor and save the adjustments in a central or distributed local or remote memory at 510.

The process of FIG. 5 may monitor the adjustments through a physical or virtual bus system. The hardware or wireless protocol may support an Electrical Physical layer and/or the Optical Physical layer. Such layers may be part of a Media Oriented Systems Transport (MOST) bus, a Controller Area Network (CAN) bus, an SAE J1850 bus, a Variable Pulse Width Modulated (VPWM) bus, a Pulse Width Modulated (PWM) bus, an Itellibus, a Distributed Systems Interface (DSI) bus, a byte-flight bus, a Bosch-Siemens-Temic (BST) bus, a Mobile Multimedia Link (MML) bus, a Flex Ray bus, a Domestic Digital Data Bus (D2B), an IDB-1394 bus, a SMARTwireX bus, an International Organization for Standardizations (ISO) bus and/or other automotive busses. The bus system may transfer data to established destination when enabled by a user.

When the adjustments are complete, the user may voice a second code phrase that may stop the recording process at 512 (e.g., "Stop recording"). When the command is received by the speech recognition and control process, the method closes the files that enable the adjustment parameters which is then stored in a local or remote database. The database may be inaccessible to other in-vehicle controllers. Some databases retain relationship data that link the recorded data to a vehicle or user identifier, and in some alternative processes, to a wireless network. Some alternative databases store the recorded data and user identifier in multi-element data structure in a file format that facilitates transferring the data between different devices with an index of functions for handling such data in a uniform way (e.g., a hierarchical data format). In some methods, the files are tagged (identified) by or through the processing of a third code phrase that may enable the future adjustment. In some processes a user may initiate a process that tags the file that may include the adjustment parameters by uttering a phrase. In FIG. 5, the phrase may be something like "Store: Mirror and seat setting" or "Mirror and seat setting", for example.

In FIG. 5, the adjustments enabled by the user are stored in one or more files that may comprise the parameters. When a user desires to initiate these adjustments, the user may articulate the third code phrase, e.g., "Mirror and seat setting", or part of the third code phrase (e.g., without a command word like "store"). When received, the speech recognition and control process may differentiate different users (e.g., multiple users) by analyzing the speech input and detect authorizations.

The speech recognition and control process may sample speech or sound at a rate between about 6.6 kHz and about 20 kHz. The process may derive a short term power spectra and represent a sequence of characterizing vectors containing values of particular feature parameters (e.g., through a spectrum analyzer). Some speech recognition and control processes may use or process a concatenation of allophones that may comprise a linguistic word. The allophones may be represented by Hidden Markov Models (HMM) that may be characterized by a sequence of states each of which has a well-defined transition probability. To recognize a spoken word, the process may compute a most likely sequence of states through the HMM. This process may be performed through a Viterbi algorithm, which may iteratively determine the most likely path through the associated trellis.

Individual voice characteristics of a speaker (user) may be stored locally or remotely in a central location (e.g., in a relational database that may be structured as the database described above) to identify speakers. In these processes, different users (e.g., drivers, passengers, occupants) may initiate automatic adjustments of vehicle elements even when they articulate similar or identical code phrases. In alternative processes, the storing of the adjustment parameters may be associated with a unique identifier. In one exemplary application the unique identifier may comprise the user's name appended to or nested before or within the code phrase.

Figure 6:
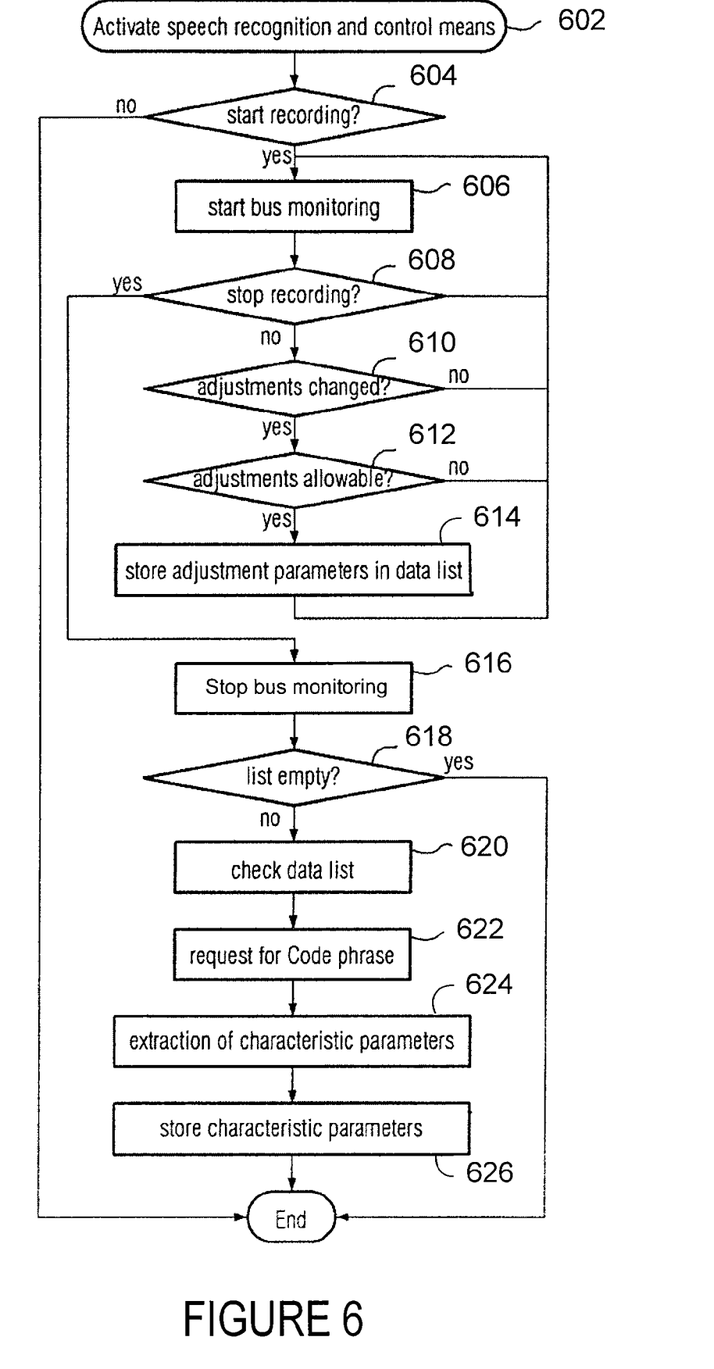
FIG. 6 is an alternative process that adjusts one or more vehicle devices.

Another example of a method that adjusts vehicle elements through a speech control is shown in FIG. 6. A speech recognition and control process that interfaces a vehicle may be activated by a user at 602. Activation may occur through a PPT or by a voice command. Once activated or awakened (if in a temporary state of suspension such as in a sleep mode) the process determines whether a recording should begin at 604. A recording may be initiated by a user that utters a code phrase or by a physical act. When a recording begins, the process may monitor one or more physical or virtual vehicle busses that may connect powertrain elements, driveline elements, running gear elements, stability control elements, braking elements, entertainment elements, comfort elements, safety elements, and/or chassis or body control elements at 606.

A user may make one or many adjustments prior, during, or after a trip (e.g., a trip may be an interval between ignition cycles). A user may adjust mirrors, the seating system, and/or the climate controls. As adjustments occur (or after all are made), the speech recognition and control process may monitor one or more bus system or query in vehicle controllers at 606. Some processes may automatically determine if an adjustment should be retained at 610 and 612. Programmed allowances may be accessed from memory to determine if information about the adjustment should be stored and later retrieved at 612. If an adjustment falls within a pre-programmed allowance, the adjustment may be stored in a local or remote memory as a data list at 614.

When the adjustments are complete, the speech recognition and control process may terminate or suspend monitoring the vehicle bus at 616. A termination or suspension may occur when a user indicates that all of intended adjustments are complete. This may occur by an articulation of a code phrase, for example.

When the monitor ends at 616, the speech recognition and control process may determine the status of the data list through a sequential or random access at 618. The list processing (e.g., maintenance and manipulation of a multi-element data structure that may involve reading memory locations) or a null pointer may indicate an empty data list if the adjustment or allowance is not part of the allowance (e.g., a self-validating process). In some processes, an optional validation may occur at 620 after an adjustment is allowed and/or authenticated. Through a graphical user interface, multi-media display, or an audio transceiver, a user may confirm settings and/or adjustment parameters. For instance, a user may add, adjust, delete and write data into elements by traversing the list (e.g., such as occurs in list processing). A user may change a list of values such as a volume setting (e.g., that may vary with vehicle speed), for example, through an input device or interface. The input device may comprise an absolute or relative pointing device enabled through a touch screen, keyboard, light pen, mouse, speech controller, etc.

When a user confirms a data list and/or has completed any desired modifications through a list processing (e.g., may involve adding and deleting elements, writing data into elements, and traversing the list through a GUI or voice control system) the user may be prompted (e.g., by a synthetic speech processing or processor) to enter a code phrase 622. The code phrase may be processed and attributes stored to uniquely identify the list. An analysis of the code phrase may include an extraction process that yields characteristic parameters at 624. A feature analysis may extract characteristic parameters that may recognized by the speech recognition and control process when a particular user articulates the code phrase. When processed, the speech recognition and control process may automatically initiate the adjustments of vehicle elements by processing the parameters retained in the data list.

Characterizing vectors that may comprise the spectral content of the detected speech signal or code phrase. The characterizing vectors may be cepstral vectors. A cepstrum process separates the glottal frequency from a vocal tract resonance. Some cepstrum processes comprise multiple acts. A logarithmic power spectrum may be calculated by a spectrum monitor, which may then be processed by an inverse Fourier transform controller. The characterizing vectors may be derived from a short-term power spectrum. A speech signal may be divided into frames of about 10 to about 20 ms durations (e.g., through sampling). Characteristic feature parameters may comprise the power of a predetermined number, e.g., some 20, discrete frequencies that are of relevance for the identification of the string representation of a spoken speech signal.

The extracted characteristic parameters may be stored at 626 and linked to the data list that is identified by these parameters. Once programmed a user's articulation of the code phrase may result in the desired automatic adjustment of one or more vehicle elements. In some processes the adjustment of a vehicle element may comprise setting parameters, e.g., tuning a visual or audio system and/or adjusting a setting.

Figure 7:
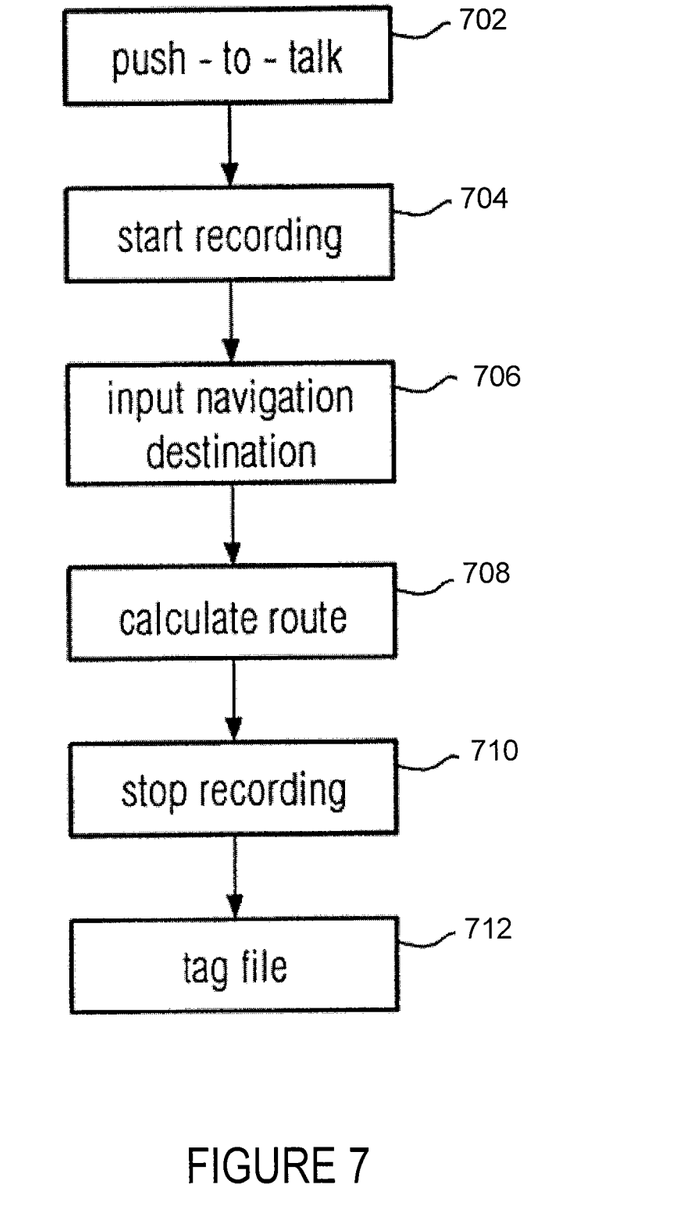
FIG. 7 is a process that sets or adjusts a navigation system.

In some applications the speech recognition and control process may be used to set or program a navigation system that is part of or interfaces a vehicle. An exemplary application is shown in FIG. 7. An occupant may activate a speech recognition and control process by enabling a push-to-talk or press-to-transmit (both referenced as a PPT) feature 702. In FIG. 7, the push-to-talk method enables a half-duplex process (e.g., it may carry information in one direction at a time without first establishing a connection with a destination as required by many wireless systems). A recording operation may be initiated when the process receives and processed a first code phrase at 704. The speech recognition and control process may differentiate and identify a user through a variety of speech patterns, accents, etc. A user may enter one or more destinations into a navigation system through a touch, speech, or device input. Destinations may be entered through absolute and/or relative devices that may be controlled through a keyboard, a pointing device (e.g., light pens, track balls) or a speech input. At 708, the process may calculate one or more routes based on the present location. In some applications a user may enter one or more arbitrary or alternative starting points to initiate route calculation from one or more desired locations(s) to the destination(s).

With the data entered, the user may articulate a second code phrase (e.g., "Stop recording") to complete the recording and settings of the navigation system at 710. The user may tag the file at 712 (e.g., through a third code phrase) by uttering a unique identifier (e.g., a name that may differentiate the user from others) and one or more of the destinations the entered. The next time the user initiates the navigation system, the user may program the navigation system by articulating the third code phrase once the speech recognition and control process is initiated.

In some systems, the parameters and adjustments or settings of a plurality of vehicle elements (including mechanical elements such as mirrors and electronic elements and devices such as navigation systems, entertainment systems, climate systems, etc.) may be locally or remotely stored with a unique code phrase(s). In some applications, a user may activate a speech recognition device or processor and articulate a name that may be compared and validated as a key word (e.g., a third code phrase that may be the same as the first or the second code phrase). In response to the key word, one or more files are read that may include adjustment parameters that adjust different vehicle elements. When identified, a recognized name may cause the speech recognition device or processor to read and process the data file(s) and automatically adjust vehicle elements. The adjustment may comprise a direct adjustment or an adjustment facilitated by intermediate parts that may be conveyed through a virtual or physical bus system.

An on-board vocal or sub vocal speech detection device or controller monitors and records output of diverse sensors and operator actions. One, two or more operating sensors (e.g., physically or wirelessly linked to a physical or virtual vehicle data bus) within the vehicle may monitor a variety of data elements. The data may be transmitted to in-vehicle OEM processors that manage powertrain, safety, entertainment, comfort, or ancillary functions. Such data elements may be communicated directly to the device (e.g., from the sensors), or from the in-vehicle OEM or out-of-vehicle processor(s) through a physical or wireless connection that may interface an in-vehicle data bus. The in-vehicle data bus may be connected to the on-board speech recognition and control device through a virtual or physical connector, such as, for example, a vehicle connector compliant with SAE-1962 or On Board Diagnostic connector (e.g., ODBI, ODBII, ODBIII, etc.) and the protocols they convey.

In some systems, in-vehicle or network communication occurs through a wireless protocol or network. Transceivers 414 (shown in FIG. 4) may interface the speech recognition controller 404 to provide short and/or long range radio, optical link, or operational links that may not require a physical communication path to receive or transmit data. The communication protocol or network may provide an interoperable communication link with other in-vehicle or external applications and/or devices. In some systems, a wireless network may provide connectivity when the wireless network or a wireless service provider indicates a channel capacity or excess channel capacity to transfer some or all of the desired data to a destination. A device push may load the desired data to a destination and may keep the connection open to allow the speech recognition controller 404 to continue sending the desired data or respond to external requests (e.g., queries). A speech recognition controller 404 may pull data to the device too, in which a connection may or may not remain open.

In some systems, the transceivers 414 may be compliant with a low-cost, low-power, wireless mesh network, such as Zigbee (e.g., 868 MHz in Europe, 915 MHz in countries such as USA and Australia, and 2.4 GHz in other jurisdictions), or a short range protocol, such as Bluetooth®. The Bluetooth word mark and logos may be owned by Bluetooth SIG, Inc. Bluetooth may encompass the wireless specification defined by IEEE 802.15, 802.15.4 (TG4), 802.15.3 (TG3), or other standards. The standard may include multiple sub-layers including an RF layer that may be based on an antenna power range starting at about 0 dBm up to a range of about 20 dBm in the abut 2.4 GHz band and having a link range from about 10 centimeters to about 10 meters. It may include a base band layer that establishes a physical link between devices forming a piconet (e.g., a network of devices that may be connected in an ad hoc fashion). It may include a link manager that sets up the link between Bluetooth devices. Other functions of the link manager may include security, negotiation of base band packet sizes, power mode and duty cycle control of the communication portion of the device, and the connection states of a compliant device in a piconet. Also, it may include a logical link control and adaptation protocol (L2CAP) that provides the upper layer protocols with connectionless and connection-oriented services.

A cellular or wireless protocol, a wireless or cellular telephone, a radio, a satellite, or other wireless communication system may link the speech recognition controller 404 (through the optional) transceivers 414 to a privately accessible or publicly accessible distributed network or directly to an intermediate surrogate. This may occur when data is stored at a remote location (e.g., located away from the vehicle). The communication link may comprise Mobile-FI or a low-cost, always-on, mobile broadband wireless network that may have IP (Internet Protocol) roaming & handoff (at more than about 1 Mbit/s), MAC and PHY with IP and adaptive antennas, full mobility or substantial mobility up to vehicle speeds of about 88.7-162 km/h or higher (e.g., 250 km/h), operate in frequency bands (below 3.5 GHz), and/or utilize a packet architecture and have a low latency. In some applications, the speech recognition controller may be Ultra-wideband compliant and may transmit information by generating radio energy at specific time instants and occupying large bandwidth, thus enabling a pulse-position or time-modulation communications. This protocol may be different from other wireless protocols that transmit information by varying the power level, frequency, and/or phase of a sinusoidal wave. In other applications, the system may be complaint with WiMax or IEEE 802.16a or may have a frequency band within a range of about 2 to about 11 GHz, a range of about 31 miles, and a data transfer rate of about 70 Mbps. In other applications, the speech recognition controller may be compliant with a Wi-Fi protocols or multiple protocols or subsets (e.g., ZigBee, High Speed Packet Access (e.g., High Speed Downlink Packet Access and/or High Speed Uplink Packet Access), Bluetooth, Mobile-Fi, Ultrawideband, Wi-Fi, WiMax, mobile WiMax, cellular, satellite, etc., referred to as the transceiver protocols) that may be automatically detected and selected (through a handshaking, for example, that may automatically determine the source type of the transmission e.g., by a query for example, and may attempt to match it) and may enable this automatic access through one or more communication nodes. In some systems, automatic selection and/or detection may occur through an exchange of signals that acknowledge a communication or a transfer of information or data may occur at a desired or predetermined channel capacity. In some alternative systems, a speech recognition controller may not directly communicate or connect to a central destination. Like a mesh network, the speech recognition controller may transmit information between other speech recognition controllers (like an electronic bucket brigade) which may be relayed to a destination. Built-in logic may allow some speech recognition controller to relay information from one device to another device when wireless networks are unavailable, device failures occur, bandwidth restrictions occur, or other conditions warrant. In some applications, a receive-and-relay feature in some devices may allow devices to conserve power by not transmitting data or messages continuously and directly to destinations. Some devices may communicate data across relatively short distances (e.g., a few yards or 100 yards between mobile or stationary devices, for example) instead of the larger distances a communication to a stationary wireless base station may require.

Figure 8:
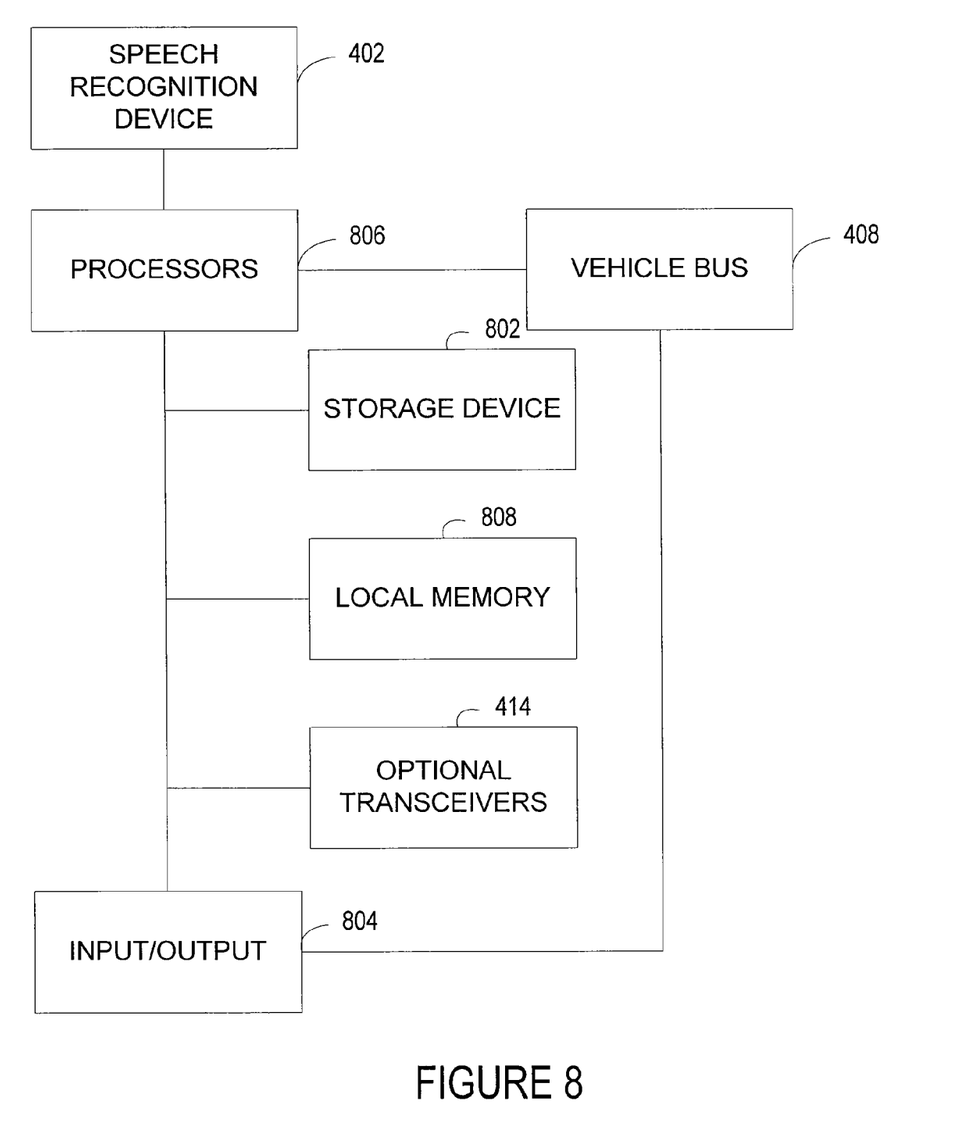
FIG. 8 is an alternative system that may adjust one or more vehicle devices.

FIG. 8 is a block diagram of an exemplary in-vehicle sub-vocal or vocal speech recognition system. The on-board mobile vocal or sub vocal speech detection system may include an on-board data storage device 802 (e.g., that may retain databases), an input/output interface 804 that may communicate with one or more external devices, one or more central processing units 806, and a local memory 810 that may be separated into multiple partitions or portions. In alternative in-vehicle systems, the portable mobile vocal or sub vocal speech detection system comprises one or more controllers or microprocessors 806 that may be interfaced through expansion connectors. The optional transceivers 414 may support two or more (e.g., multiple) modulation schemes and may include two or more input/outputs to different wireless networks or protocols. The inclusion of multiple protocols and/or inputs/outputs may allow the device to support higher throughputs as wireless networks and connections become available or accessible. The exemplary in-vehicle systems may be portable or interface vehicle connectors too. Each of the systems may include memory accessible only to the user. The memory 808 may be inaccessible to other in-vehicle OEM or aftermarket systems to ensure data integrity. Hardware, data encryption, or software may maintain data security. Data accuracy and/or conformity may be important to users or applications that ensure safety.

Other alternate systems and methods may include combinations of some or all of the structure and functions described above or shown in one or more or each of the figures. These systems or methods are formed from any combination of structure and function described or illustrated within the figures. Some alternative systems or devices compliant with one or more of the transceiver protocols may communicate with one or more in-vehicle displays, including touch sensitive displays. In-vehicle and out-of-vehicle wireless connectivity between the device, the vehicle, and one or more wireless networks provide high speed connections that allow users to initiate or complete a function at any time within a stationary or moving vehicle. The wireless connections may provide access to, or transmit, static or dynamic content. The interoperability of some devices to in-vehicle networks and external wireless protocols allows some devices to provide primary or back-up functionality to in-vehicle equipment, including OEM and/or aftermarket equipment.

Another alternative system may process "silent" speech (or sub vocal technology) to understand and relay words that have not been spoken. Through the use of physical detectors (e.g., such as electrodes), wearable translators, and or the use of transceivers, a local transceiver in communication with the speech recognition device or processor may receive data describing the biological signals that occur when a person reads to talks to him or herself. By recognizing the words that may not be perceived by an ear, the system may be substantially immune to background noise and other media that may distort or corrupt speech through noises and/or other barriers. Some systems may be identical to those described, with the exception of detecting "silent speech" exclusively or in combination with aural speech.

The methods and descriptions above may be encoded in a signal bearing medium, a computer readable medium or a computer readable storage medium such as a memory that may comprise unitary or separate logic, programmed within a device such as one or more integrated circuits, or processed by a controller or a computer. If the methods or descriptions are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to the a speech recognition device or processor. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable storage medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive, vehicle, or wireless communication bus through any hardwired or wireless automotive communication protocol, combinations, or other hardwired or wireless communication protocols to a local or remote destination, server, or cluster.

A computer-readable medium, machine-readable storage medium, propagated-signal medium, and/or signal-bearing medium may comprise any medium that contains, stores, communicates, propagates, or transports software for use by or in connection with an instruction executable system, apparatus, or device. The machine-readable storage medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A speech processing device comprising:
   an automotive device that provides an interface that filters data that is sent and received across an in-vehicle bus by selectively acquiring vehicle data related to user vehicle settings or adjustment of an in-vehicle system, the interface acquires the selected vehicle data from one or more in-vehicle sensors in response to a user's articulation of a first code phrase;
   a memory that stores the selected vehicle data with unique identifying data including individual voice characteristics associated with the user within the vehicle that establishes a connection between the selected vehicle data and the user and to differentiate the user from other different users when a second code phrase is articulated by the user, the memory further storing a third code phrase that is detected responsive to a prompt, the prompt being transmitted to the user in response to detection of the articulation of the second code phrase, and the third code phrase tagging the selected vehicle data, wherein the first and second code phrases are the same for any vehicle adjustment recording and the third code phrase is different from the first and second code phrases and denotes at least one vehicle element to be adjusted; and a data interface that provides access to the selected vehicle data and relationship data retained in the memory and enables the processing of the data to customize the in-vehicle system, where the data interface is responsive to the user's articulation of the third code phrase to process the selected vehicle data that customizes the vehicle.

2. The speech processing system of claim 1 where the in-vehicle system comprises a plurality of in-vehicle systems that include an entertainment setting and a climate setting.

3. The speech processing system of claim 1 where the memory comprises a distributed memory that is linked to the vehicle, where tagging the selected vehicle data comprises storing a tag including an identifier, characters, or one or more pointers that identify an address of a data file for the selected vehicle data in the distributed memory, and where the selected vehicle data and the unique identifying data are stored in a multi-element data structure in a hierarchical file format.

4. The speech processing system of claim 1 further comprising a digitizing device that converts a continuous spectrum of a voiced code phrase into a digital form.

5. The speech processing system of claim 1 where the customization of the in-vehicle system comprises initiating a mechanical device that communicates with the data interface.

6. The speech processing system of claim 1 where the automotive device selectively acquires vehicle data by polling a vehicle electronic control module through an original equipment manufacturer's data bus.

7. The speech processing system of claim 1 further comprising a speech synthesizer in communication with the automotive device to synthesize speech.

8. The speech processing system of claim 1 where the automotive device comprises a speech recognition device in communication with a controller where the controller is configured to communicate with a vehicle device that is customized by the user.

9. The speech processing system of claim 8 where the speech recognition device may interpret a continuous flow of an aural sound that includes the user's first code phrase, the user's second code phrase and the user's third code phrase.

10. The speech processing system of claim 9 where the controller acquires software that permits the controller to communicate with the device that the user sets or adjusts.

11. The speech processing system of claim 10 where the in-vehicle bus comprises one or more of a Media Oriented System Transport bus and a wireless bus, and wherein processing the selected vehicle data that customizes the vehicle comprises performing the adjustment of the in-vehicle system that was made between the user's articulation of the first code phrase and the articulation of the second code phrase.

12. The speech processing system of claim 11 where the automotive device comprises a spectrum analyzer that derives a short-term power spectrum and generates a sequence of vectors when processing the user's first code phrase, the user's second code phrase, and the user's third code phrase.

13. The speech processing system of claim 10 further comprising a half-duplex transceiver in communication with the automotive device, the half-duplex transceiver configured to transmit data in one direction without first establishing a connection with a destination.

14. The speech processing system of claim 1 where the third code phrase includes a command word, and where the vehicle data is processed to customize the in-vehicle system responsive to the user's articulation of a part of the third code phrase without the command word.

15. The speech processing system of claim 1 where the in-vehicle system comprises a navigation system and where selectively acquiring vehicle data related to the user vehicle settings or adjustment of the in-vehicle system comprises automatically determining whether the user vehicle settings or adjustment of the in-vehicle system are to be retained based on one or more programmed allowances.

16. The speech processing system of claim 1 where the automotive device is configured to store the selected vehicle data into the memory through a multi-element data structure that enables list processing that adds and deletes elements, writes data into elements, and traverses the list.

17. The speech processing system of claim 1 where the user's first code phrase, the user's second code phrase, and the user's third code phrase comprise silent speech not perceived by a human ear that may be generated when a person speaks to him or herself.

18. A system that automatically adjusts at least one vehicle element, comprising:

a speech recognition device configured to interpret a continuous or interrupted flow of sound that comprises a user's speech in real time based at least in part on stored individual voice characteristics associated with the user to differentiate the user from other different users;

a controller in communication with the speech recognition device;

an in-vehicle actuator in communication with the speech recognition device, the controller, and at least one vehicle element;

a bus system that interfaces the speech recognition device and the in-vehicle actuator; where the speech recognition device is configured to recognize a first code phrase as being articulated by the user;

generate a data file and monitor an in-vehicle bus system in response to the recognition of the first code phrase;

recognize a second code phrase as being articulated by the user;

write to the data file monitored data related to the adjustment of the at least one vehicle element and/or adjustment parameters obtained from the in-vehicle data bus after completion of the adjustment of the at least one vehicle element in response to the speech recognition device detection of the second code phrase;

transmit a prompt to the user;

recognize a third code phrase articulated by the user in response to the prompt, wherein each of the first and second code phrases are the same for any vehicle adjustment recording and the third code phrase is different from the first and second code phrases and denotes the at least one vehicle element to be adjusted;

tag the data file with the recognized third code phrase detected by the speech recognition device; and in response to a second detection of the third code phrase, cause the controller to enable the actuator to adjust the at least one vehicle element based on the processing of the data file.

19. The system of claim 18 further comprising a half-duplex transceiver in communication with the speech recognition device, the half-duplex transceiver configured to transmit data in one direction without first establishing a connection with a destination.

20. The system of claim 19 where the at least one vehicle element comprises a navigation system.

* * * * *